United States Patent

Chan et al.

[11] Patent Number: 5,874,386
[45] Date of Patent: Feb. 23, 1999

[54] METHOD FOR CLEANING DRILLING FLUID SOLIDS FROM A WELLBORE USING A SURFACTANT COMPOSITION

[75] Inventors: Albert F. Chan, Plano; William Mark Bohon; David J. Blumer, both of Anchorage; Kieu T. Ly, Richardson, all of Tex.

[73] Assignee: Atlantic Richfield Company, Los Angeles, Calif.

[21] Appl. No.: 23,521

[22] Filed: Feb. 13, 1998

[51] Int. Cl.[6] .............................. C09K 7/02; E21B 21/00
[52] U.S. Cl. ......................... 507/211; 507/261; 507/262; 507/266; 507/276; 507/277; 166/297; 166/304; 166/312
[58] Field of Search ................................... 507/209, 211, 507/261, 262, 266, 276, 277; 166/297, 304, 312

[56] References Cited

U.S. PATENT DOCUMENTS

| | | | |
|---|---|---|---|
| 3,070,162 | 12/1962 | Barnard, Jr. | 166/38 |
| 3,529,666 | 9/1970 | Crowe | 166/300 |
| 3,653,441 | 4/1972 | Tuttle | 166/291 |
| 3,756,319 | 9/1973 | Holm et al. | 166/304 |
| 3,884,302 | 5/1975 | Messenger | 166/291 |
| 4,423,781 | 1/1984 | Thomas | 166/312 |
| 4,528,106 | 7/1985 | Grolitzer | 252/8.55 D |
| 4,565,647 | 1/1986 | Llenado | 252/354 |
| 4,648,453 | 3/1987 | Nagra et al. | 166/281 |
| 4,681,164 | 7/1987 | Stacks | 166/304 |
| 4,856,589 | 8/1989 | Kuhlman et al. | 507/211 |
| 4,985,154 | 1/1991 | Balzer et al. | 507/211 |
| 5,030,366 | 7/1991 | Wilson et al. | 252/8.551 |
| 5,164,116 | 11/1992 | Berkhof et al. | 252/522 |
| 5,221,343 | 6/1993 | Grauer et al. | 106/729 |
| 5,374,361 | 12/1994 | Chan | 507/211 |
| 5,458,197 | 10/1995 | Chan | 166/304 |
| 5,466,746 | 11/1995 | Geck et al. | 524/837 |
| 5,627,144 | 5/1997 | Urfer et al. | 507/211 |

OTHER PUBLICATIONS

"Interfacial Tensions and Solubilizing Ability of a Microemulsion Phase that Coexists With Oil and Brine", *Journal of Colloid and Interface Science,* vol. 71, No. 2., Sep. 1979.

SPE 25181 "Surfactants: Additives to Improve the Performance of Properties of Cements" by K. M. Cowam, Shell Development Co., and Larry Eoff, Halliburton Services, Society of Petroleum Engineers, Inc., 1993.

"Product Line of Sugar Lipids", SIMULSOL*SL SEPPIC, Inc., 30 Two Bridges Road, Suite 225, Fairfield, N.J. 07006, no date available.

Alkyl Polyglycosides: Tecnology, Properties and Applications, edited by Karlheinz Hill, Wolfgan Von Rybinski and Gerhard Stoll, VCH Verlagegesellschaft Wbh, Weinhem Federal Repulbic of Germany) and VCH Publishers Inc., New York, New York 1997, pp. 11–12.

*Primary Examiner*—Philip Tucker
*Attorney, Agent, or Firm*—F. Lindsey Scott

[57] ABSTRACT

A method and composition for removing deposits of heavy hydrocarbonaceous materials and finely divided drilling fluid solids from a wellbore using a composition containing an alkyl polyglycoside, an ethoxylated alcohol, a caustic and an alkyl alcohol by injecting the composition into the wellbore, maintaining the composition in the wellbore for a selected time and thereafter producing the composition from the wellbore.

5 Claims, 2 Drawing Sheets

2(a)   2(b)   2(c)   2(d)

METHOD FOR CLEANING DRILLING FLUID SOLIDS FROM A WELLBORE USING A SURFACTANT COMPOSITION

BACKGROUND OF THE INVENTION

1. Field of the Invention

This invention relates to the removal of deposits comprising heavy hydrocarbonaceous materials and finely divided inorganic drilling fluid solids from a wellbore using an alkyl polyglycoside surfactant composition.

2. Background of the Invention

Many oil wells are drilled using oil-based drilling fluids. These drilling fluids may contain emulsified oil, mineral oil, synthetic oil, diesel oil, residual crude oil or other suitable organic liquids having a suitable density and other properties required in a drilling fluid. These drilling fluids typically contain weighting materials, which comprise finely divided solids, and also, immediately upon initiation of drilling, finely divided inorganic solids removed from the subterranean area through which the well is drilled. These solids become oil-covered during drilling and may be covered with not only the oil used in the oil-based drilling fluid, but also with some crude oil when an oil-bearing formation is penetrated. During drilling operations, some fluid from the drilling fluid leaks off into the formation, as well known to those skilled in the art. As a result, some of the solids in the drilling fluid are deposited on the formation face or in the near wellbore formation. Such deposits on the formation face are commonly referred to as "filter cake". The solids comprise finely divided inorganic solids coated with emulsified oil or heavy oil components. These solids tend to agglomerate and are difficult to displace from the formation, even when the production of fluids from the formation is commenced. This can result in formation damage and result in the production of lower volumes of fluid from the formation than would otherwise be possible. These drilling fluid solids, when coated with emulsified oil, tend to agglomerate and form masses of solids which are not readily dislodged from formation pores, passageways and the like. Further, cakes of the solids deposited on the face of the formation may not be removed by the production of fluids from the formation. In both instances, the production of fluids from the formation is restricted.

Since it is desirable to produce the maximum volume possible from the formation, methods have long been sought for remediating such formation damage and for removing such drilling fluid solids from the face of the formation and from the near wellbore formation.

SUMMARY OF THE INVENTION

According to the present invention, it has now been found that such oil-covered drilling fluid solids are readily removed from a wellbore by injecting an aqueous surfactant composition containing about 0.1 to about 10.0 weight percent of an alkyl polyglycoside surfactant selected from alkyl polyglycosides containing alkyl groups containing from about 8 to about 19 carbon atoms and mixtures thereof and having a DP number from about 1.3 to about 1.8; about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof and ethoxylated alkyl phenols containing from about 8 to about 14 carbon atoms in the alkyl group and from about 2 to about 8 ethylene oxide groups and mixtures thereof and mixtures of the ethoxylated alkyl alcohols and the ethoxylated alkyl phenols; about 0.5 to about 10.0 weight percent of a caustic selected from the group consisting of sodium hydroxide, potassium hydroxide, ammonium hydroxide and mixtures thereof; and about 0.1 to about 6.0 weight percent of at least one alkyl alcohol containing from about 4 to about 6 carbon atoms into the wellbore to fill the wellbore to a selected level; maintaining the aqueous surfactant composition in the wellbore for a selected time period; and producing at least a major portion of the aqueous surfactant composition from the wellbore thereby removing at least a portion of the drilling fluid solids from the wellbore.

DESCRIPTION OF PREFERRED EMBODIMENTS

Figure 1:
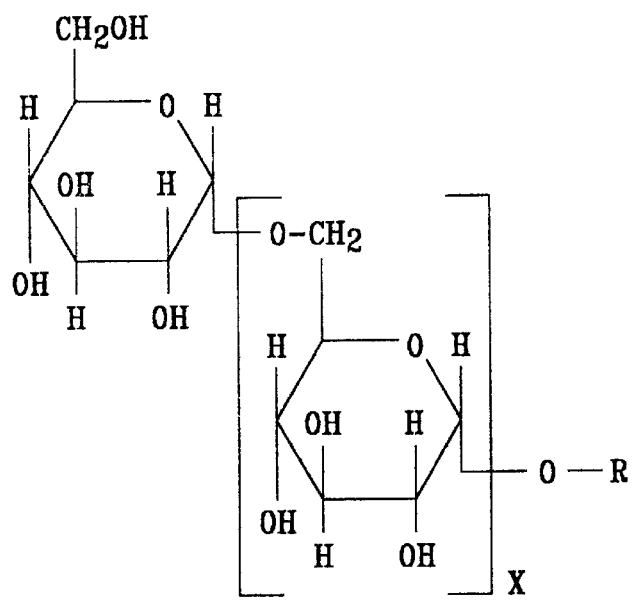
FIG. 1 is a diagram of the molecular structure of an alkyl polyglycoside.

In the discussion of the figures, various pumps, valves and the like necessary to achieve the flows described have not been shown in the interest of conciseness. All concentrations are by weight percent of active ingredient in the aqueous solution unless otherwise stated.

The surfactant composition of the present invention consists essentially of an aqueous solution containing from about 0.1 to about 10.0 weight percent, and preferably from about 0.2 to about 4.0 weight percent, of an alkyl polyglycoside surfactant selected from alkyl polyglycosides containing alkyl groups containing from about 8 to about 19 carbon atoms and mixtures thereof; from about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl phenols and the ethoxylated alkyl alcohols; from about 0.5 to about 10.0 weight percent of a caustic selected from the group consisting of sodium hydroxide, potassium hydroxide, ammonium hydroxide and mixtures thereof; and, from about 0.1 to about 6.0 weight percent of at least one alkyl alcohol containing from about 4 to about 6 carbon atoms. Preferably, the alkyl polyglycoside, ethoxylated alcohol, and alkyl alcohol comprise from about 0.5 to about 6.0 weight percent of the aqueous solution. Desirably, the alkyl polyglycoside surfactant has a DP number from about 1.30 to about 1.80. The DP number is a measure of the degree of polymerization of the alkyl polyglycoside as defined in *Alkyl Polyglycosides: Technology, Properties and Applications,* edited by Karlheinz Hill, Wolfgang Von Rybinski and Gerhard Stoll, VCH Verlagegesellschaft Mbh, Weinhein (Federal Republic of Germany) and VCH Publishers Inc., New York, N.Y. 1997, pp 11–12.

The alkyl polyglycoside surfactant may comprise a first surfactant consisting essentially of an alkyl polyglycoside selected from the group consisting of alkyl polyglycosides containing alkyl groups containing an odd number of carbon atoms from about 9 to about 13 carbon atoms and mixtures thereof, and having an oligomer distribution from 1 to 12, and a second surfactant consisting essentially of alkyl polyglycosides selected from the group consisting of alkyl polyglycosides containing alkyl groups, a major portion of which are even numbered alkyl groups which contain from about 12 to about 18 carbon atoms and having an oligomer distribution from 1 to 12. Desirably, the alkyl polyglycoside surfactant contains from about 20 to about 90 mole percent of the first surfactant.

The second surfactant may also contain alkyl polyglycosides containing alkyl groups containing odd numbers of carbon atoms from about 9 to about 19 carbon atoms. Either odd-numbered or even-numbered alkyl groups may be used in either the first or the second surfactant as desired to optimize the surfactant properties.

The even numbered alkyl groups are representative of naturally occurring alkyl groups and tend to have a higher pour point and are less convenient to use as surfactants in wellbore operations and the like. Such surfactants are much more viscous and tend to gel at lower temperatures and are otherwise more difficult to handle than the corresponding alkyl polyglycosides containing alkyl groups containing an odd number of carbon atoms. The alkyl groups containing odd numbers of carbon atoms are representative of refinery product streams and are not naturally occurring.

Preferably, the ethoxylated alcohol is present in an amount equal to from about 0.2 to about 4.0 weight percent. The ethoxylated alkyl alcohol may be selected from ethoxylated linear alkyl alcohols, branched alkyl alcohols, Guerbet alcohols, mixtures thereof, and the like. The ethoxylated alkyl phenol alcohols may contain linear, branched, Guerbet or a mixture of linear, branched and Guerbet alkyl groups. It is preferred that the ethoxylated alcohol be selected from ethoxylated alkyl alcohols containing from about 8 to about 16 carbon atoms in the alkyl alcohol and from about 2 to about 6 ethylene oxide groups.

The caustic material is desirably present in an amount equal to from about 1.0 to about 5.0 weight percent of the aqueous solution. The caustic is a necessary component of the surfactant composition since it is required in combination with the alkyl polyglycosides and the ethoxylated alcohol to effectively dissolve and remove the deposits.

It is also preferred that the alkyl alcohol be present in an amount equal to from about 0.2 to about 3.0 weight percent. The alkyl alcohol may be a linear or branched alkyl alcohol. The alcohol facilitates mixing and aqueous surfactant composition stability. In the absence of the alcohol, an alkyl polyglycoside surfactant layer and a caustic layer may form in the surfactant composition. While all of the ingredients are present in each layer, they are present in different proportions. With the alkyl alcohol, a homogenous mixture is readily achieved and maintained.

The surfactant composition comprises primarily water. Accordingly, it is less economical to transport the surfactant composition in this form. It is preferred that the surfactant composition be produced at the location where it is to be used by dilution of an aqueous surfactant concentrate. A concentrate of the aqueous surfactant composition can be produced for dilution with an aqueous solution to produce the surfactant composition. The concentrate composition comprises an aqueous solution containing from about 4.0 to about 20.0 weight percent of an alkyl polyglycoside surfactant selected from alkyl polyglycosides containing alkyl groups containing from about 8 to about 19 carbon atoms and mixtures thereof; from about 1.0 to about 15.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof and ethoxylated alkyl phenols containing from about 8 to about 14 carbon atoms in the alkyl group and from about 2 to about 8 ethylene oxide groups and mixtures thereof and mixtures of the ethoxylated alkyl alcohols and the ethoxylated alkyl phenols; from about 4.0 to about 30.0 weight percent of a caustic selected from the group consisting of sodium hydroxide, potassium hydroxide, ammonium hydroxide and mixtures thereof; and from about 0.5 to about 10.0 weight percent of at least one alkyl alcohol containing from about 4 to about 6 carbon atoms. Concentrated compositions containing more of the materials tend to gel and are difficult to handle and to dilute to produce the surfactant composition. Preferably, the concentrate composition is from about 4.0 to about 12.0 weight percent alkyl polyglycoside surfactant in the aqueous solution; from about 1.0 to about 8.0 weight percent ethoxylated alcohol in the aqueous solution; from about 6.0 to about 22.0 weight percent caustic in the aqueous solution; and from about 1.0 to about 10.0 weight percent alcohol in the aqueous solution. The alkyl polyglycosides and other materials are as described in conjunction with the surfactant composition above.

While the surfactant compositions may be used at substantially any temperature between their freezing points and their boiling points, it is preferred that they be used at wellbore temperatures above about 120° F. At lower temperatures, longer contact times may be required to remove the oil-covered drilling fluid solids.

The concentrate may be used at full strength or at any desired dilution.

It is preferred that the concentrate contain a suitable hydrotrope to improve the phase stability of the concentrate and the surfactant composition. The hydrotrope may be a hydrotrope such as monosodium salt of N-lauryl-β-iminodipropionic acid, an alkyl polyglycoside containing linear or branched alkyl groups containing from about 4 to about 8 carbon atoms and the like.

The surfactant composition functions as an alkaline cleaner which solubilizes and disperses the oil from the oil-covered drilling fluid solids into the surfactant composition.

Since the surfactant composition includes a foaming surfactant, it is desirable in many applications to add a suitable quantity of an antifoaming compound such as, for example, a silicon-based antifoam compound. Preferably, the antifoaming additive is added at a concentration from about 10 to about 100 ppm to the aqueous solution containing the caustic before addition of the other materials.

Alkyl polyglycoside surfactants consist of a polar glucose head and an organic carbon chain off of the hemiacetal linkage. A representation of the molecule is shown in FIG. 1. There are two ether oxygens and three hydroxyl groups per glucose unit, plus a terminal hydroxyl group. The lipophilic portion of the molecule resides in the alkyl chain R. R can be a linear or branched alkyl group containing from about 8 to about 18 carbon atoms or a Guerbet alkyl containing from about 9 to about 19 carbon atoms. The polymerization reaction can provide oligomer distributions from 1 to 12 (i.e. x=0 to x=11).

Figure 2:
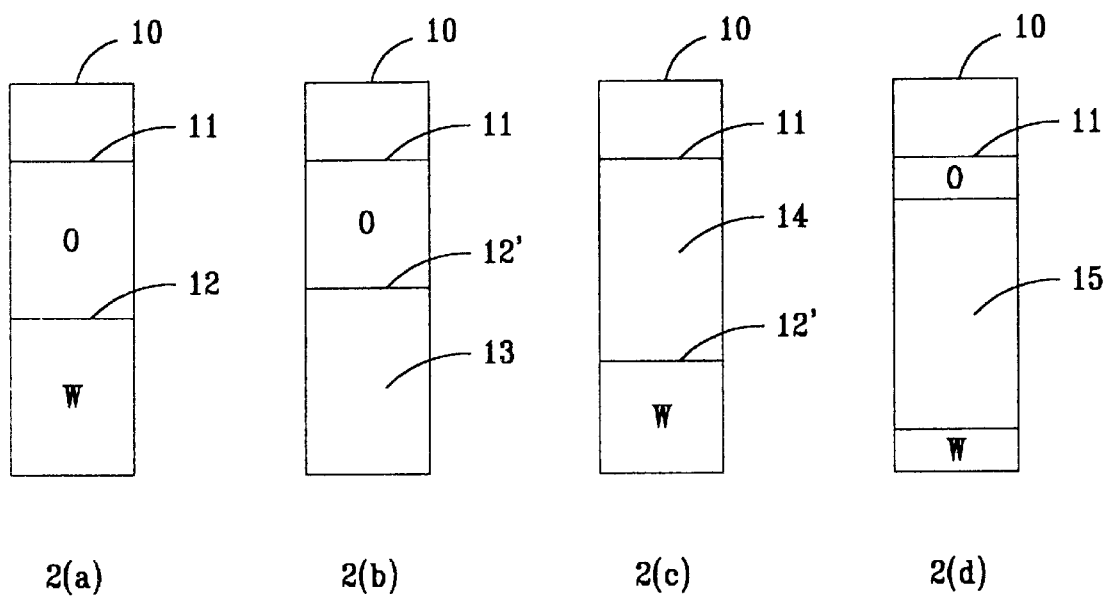
FIG. 2 shows four oil/water systems including Type I, Type II and Type III microemulsions.

In the use of the surfactant composition, it is desirable that the ratio of components be adjusted by testing with the deposits to be removed to form a Type III microemulsion in the wellbore. Such microemulsions are referred to as Windsor Type III or middle phase microemulsions and are described in some detail in "Micellization, Solubilization and Microemulsions", Vol. 2, K. L. Mittal, Plenum Press, New York, 1977. In FIG. 2, Type I, Type II and Type III microemulsions are shown. FIG. 2(a) shows oil (o) and water (w) containing surfactants in a container 10 to a level 11 and having an interface 12. In FIG. 2(b), a Type I microemulsion 13, which is an oil-in-water microemulsion, is shown below an excess oil layer (o). Such microemulsions are water soluble and contain quantities of solubilized oil, as shown by the level of the new interface 12' which is above the original interface 12. In FIG. 2(c), a Type II microemulsion 14, which is a water-in-oil microemulsion, is shown above an excess water layer (w). Such microemulsions are oil soluble and contain quantities of solubilized water as shown by the level of new interface 12' which is below the original interface 12. FIG. 2(d) shows a Type III microemulsion 15, which is located between the excess oil (o) and excess water (w) phases and extends above and below original interface 12. Such Type III microemulsions are preferred for pipe and wellbore cleaning operations since their interfacial tensions and solubilization properties toward both oil and water can greatly facilitate the removal of both from wellbores and formation surfaces. Since it is desirable that the oil-covered drilling fluid solids be dissolved, dispersed, and removed in the aqueous surfactant, it is desirable that the aqueous surfactant be formulated to produce a Type III microemulsion in the wellbore. Such microemulsions are much more effective in dissolving hydro-carbonaceous materials in the presence of aqueous solutions than either Type I or Type II microemulsions. It is not necessary that the composition be adjusted to form the desired Type III microemulsion, but it is considered that the surfactant composition is more effective when adjusted to form a Type III microemulsion in the treated area. Furthermore, the microemulsions have better injectivity and penetrate subterranean formations more readily because of their lower interfacial tension and their lower viscosity.

Figure 3:
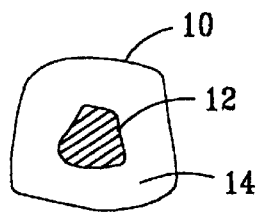
FIG. 3 is a schematic cross-sectional view of a sand grain or a particle of drilling fluid solids coated with emulsified oil or heavy hydrocarbonaceous materials; and, FIG. 4 is a schematic diagram of a well completed for the production of fluids from a subterranean formation.

A schematic of a typical oil-covered drilling fluid particle 10 is shown in FIG. 3. The oil-covered particle comprises an inorganic solid particle nucleus or a sand grain 12 surrounded by a layer of emulsified oil 14.

Figure 4:
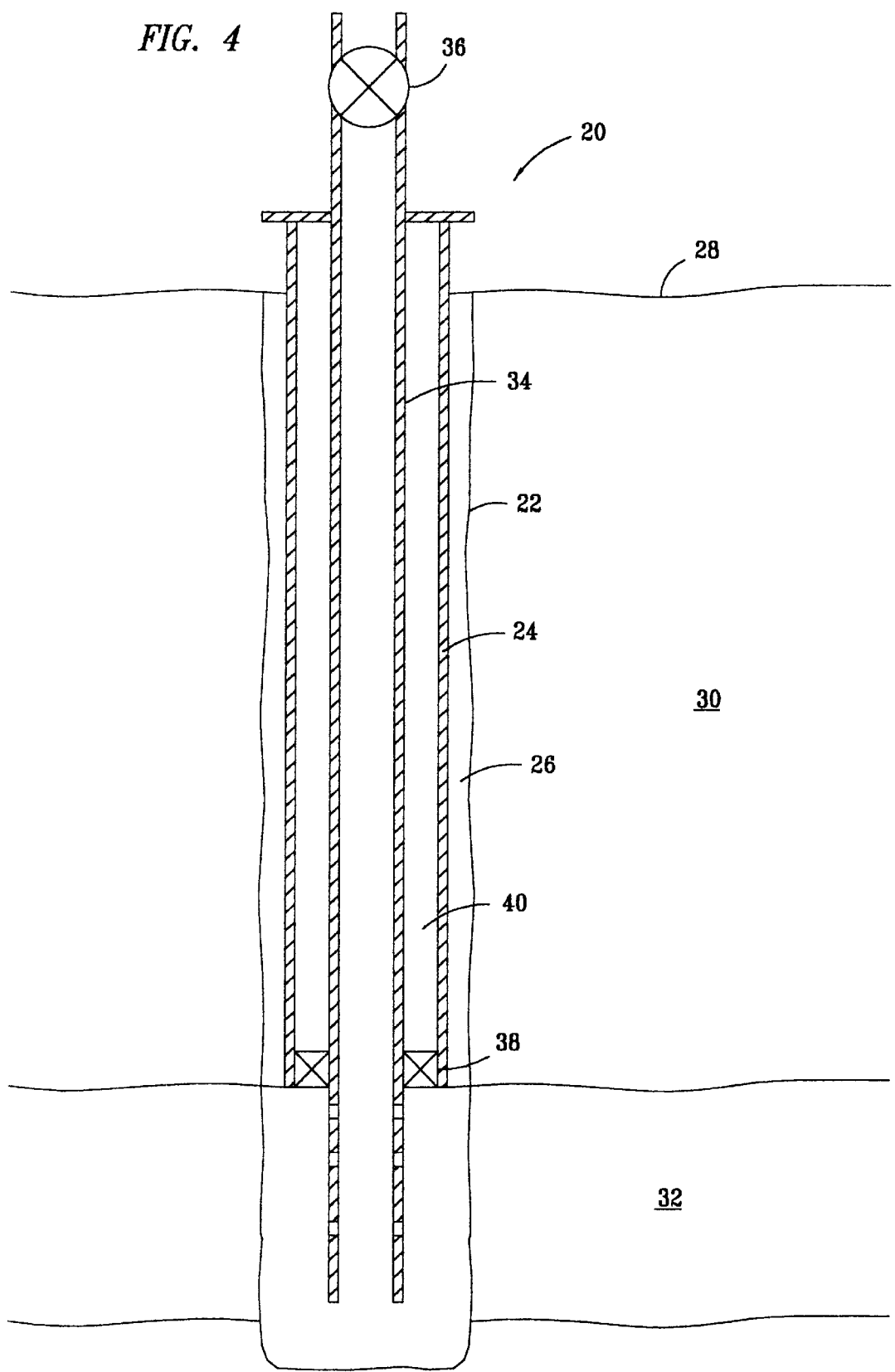

In FIG. 4, a well 20 is shown extending from a surface 28 through an overburden 30 and penetrating an oil-bearing formation 32. Well 20 includes a wellbore 22 and a casing 24 cemented in place with cement 26. The casing, as shown, extends to approximately the top of oil-bearing formation 32. Well 20 also includes a production tubing 34 positioned from the surface to near the top of oil-bearing formation 32 and includes on its lower end and extending into or through formation 32 a slotted or perforated liner 42. A packer 38 is positioned between tubing 34 and casing 24 near the bottom of tubing 34 to prevent flow through the annular space between the tubing and the casing. A wellhead is shown schematically as a valve 36 and should be understood to represent a wellhead adapted to control the flow of fluids into and from well 20.

The procedure for drilling such wells is well known to those skilled in the art and basically comprises rotating a drill bit positioned on the lower end of a drillstring with passage during drilling of a drilling fluid, sometimes called a drilling mud, downwardly through the drillstring, outwardly through the drill bit and then upwardly through the annular space between the outside of the drillstring and the inside of the wellbore. As the well is deepened, additional sections of drillstring tubing are added to the drillstring. The well is drilled by rotation of the drill bit by rotation of the drillstring with cuttings and the like being removed from the well upwardly through the annular space between the outside of the drillstring and the inside of the wellbore. Such drilling practices are very well known to the art and need not be discussed further.

In the drilling of wells, it is advantageous in many instances to use an oil-based drilling fluid or drilling mud. The oil component is selected to meet the requirements of the particular drilling operation and may be diesel oil, mineral oil, synthetic oil, residual crude oil or the like. After the completion of drilling operations, a casing is typically set in the wellbore to a desired depth and cemented in place. Cementing is accomplished by passing a cement slurry downwardly through the casing and then upwardly to fill the annular space between the outside of the casing and the inside of the wellbore. A spacer fluid or the like may be used ahead of the cement slurry to improve the cement bonding. As is well known to those skilled in the art, wells may be cased to or through the zone of interest. In many instances, it may be desired to produce oil or other fluids from a subterranean formation open hole, i.e. with no casing through the formation of interest. In other instances, it may be desirable to extend the casing through the zone of interest and then perforate the casing in the zone of interest to permit fluid communication between the zone of interest and the inside of the casing. A wide variety of well completions is known to those skilled in the art and may be used in suitable instances. The drilling fluid contains weighting components, which may be finely divided particulates, and in any event contains finely divided particulates (inorganic solids) of the materials comprising the formation through which the well is drilled. These particulate materials are typically suspended but not dissolved in the drilling mud. A portion of the oil in the drilling mud frequently bleeds off into the formation as a result of the pressure in the well urging the drilling mud to the surface. When this bleed off occurs, the dispersed solids in the drilling fluid are deposited on the inner surfaces of the well and in the portions of the formation around the wellbore. These deposits are frequently referred to as filter cake. When oil-based drilling fluids are used, the filter cake is oil-wet.

In oil-bearing formations and other porous formations contacted by the drilling fluid, the solids may be deposited on the inner surfaces of the wellbore and in the pores and other passageways in the formation for a small distance outside the wellbore (near wellbore zone). These solids are initially oil-covered and may become covered with additional heavier hydrocarbonaceous materials from the oil-bearing formation. With a finely divided particle as a nucleus, the carbonaceous materials may surround the nucleus forming an oil-covered particle which is relatively stable and is not readily removed from the face of the formation or from the near wellbore region. Other wellbore operations may remove a portion of the filter cake from the face of the formation of interest, but it is difficult to remove the deposits of such oil-covered drilling fluid particles formed by the hydrocarbonaceous materials in combination with the finely divided inorganic particles from the near wellbore zone. As a result, these materials remain in the small pores, passageways and other openings in the near wellbore zone surrounding well 20 in formation 32. The presence of these materials can greatly reduce the ability of formation 32 to produce oil. Since the pores and other passageways are partially blocked in the area surrounding well 20, the flow of liquids from formation 32 into well 20 is restricted. Various techniques, such as washing with organic solvents and the like, have been used in attempts to remove such materials, but such materials have proven very difficult to remove.

According to the present invention, it has been found that the use of the aqueous surfactant composition discussed is effective to remove these oil-covered particles. The materials are removed by injecting the aqueous surfactant composition into the wellbore, maintaining it in the wellbore for a selected period of time which is typically at least about 1 hour and suitably may be from about 1 to about 4 hours, and thereafter producing fluids from formation 32 through well 20. The surfactant composition may be placed in contact with formation 32 by injecting it through tubing 34 in a quantity sufficient to fill well 20 to a selected level which is a level sufficient to fill that portion of well 20 beneath tubing 34 or at least the portion of well 20 in fluid communication with the formation of interest. The surfactant composition, as injected, is then maintained in position by closing valve 36. Most formations, after drilling, have sufficient pressure to prevent the flow of fluids into the formation as a result of the hydrostatic pressure in tubing 34. After the aqueous surfactant composition has been maintained in contact with the wellbore surfaces of interest for a suitable time period, valve 36 is opened and the surfactant composition is flushed from the well by producing fluids from formation 32. Since at least a major portion of the oil contained in the oil-covered drilling fluid solids is dispersed in the aqueous surfactant composition the solids are readily displaced by the production of fluids from the formation and are recovered with the produced fluids containing the aqueous surfactant composition or with subsequently produced fluids. The produced fluids containing the aqueous surfactant composition generally are segregated in a slop oil tank or the like for treatment and disposal. It has been found that the use of the aqueous surfactant composition is very effective to disperse hydrocarbonaceous-material-coating inorganic particles.

Having thus described the present invention by reference to certain of its preferred embodiments, it is pointed out that many variations and modifications are possible within the scope of the present invention. Many such variations and modifications may be considered obvious and desirable by those skilled in the art based upon the foregoing description of preferred embodiments.

We claim:
1. A method for removing oil-covered drilling fluid solids comprising heavy hydrocarbonaceous materials and finely divided inorganic solids from a wellbore comprising:
   a) injecting an aqueous surfactant composition comprising an aqueous solution containing:
      1) about 0.1 to about 10.0 weight percent of an alkyl polyglycoside surfactant selected from alkyl polyglycosides containing alkyl groups containing from about 8 to about 19 carbon atoms and mixtures thereof;
      2) about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl alcohols and the ethoxylated alkyl phenols;
      3) about 0.5 to about 10.0 weight percent of a caustic selected from the group consisting of sodium hydroxide, potassium hydroxide, ammonium hydroxide and mixtures thereof; and,
      4) about 0.1 to about 6.0 weight percent of at least one alkyl alcohol containing from about 4 to about 6 carbon atoms;
      into the wellbore to fill the wellbore to a selected level;
   b) maintaining the aqueous surfactant composition in the wellbore for a selected time period; and
   c) producing at least a major portion of the aqueous surfactant composition from the wellbore thereby removing at least a portion of the drilling fluid solids from the wellbore.
2. The method of claim 1 wherein the aqueous surfactant composition is positioned in an uncased portion of the wellbore.
3. The method of claim 1 wherein the aqueous surfactant composition is positioned in a cased and perforated portion of the wellbore.
4. The method of claim 1 wherein the selected time period is more than 1 hour.
5. The method of claim 1 wherein the selected time period is from about 1 hour to about 4 hours.

* * * * *